Nov. 29, 1966  C. W. OJA ET AL  3,288,250
BRAKING MEANS FOR MOBILE DEVICES
Filed July 8, 1965

INVENTORS
CARL W. OJA
RICHARD L. SCHEUERMAN
BY Robert C Baker
ATTORNEY

United States Patent Office 3,288,250
Patented Nov. 29, 1966

3,288,250
BRAKING MEANS FOR MOBILE DEVICES
Carl W. Oja, 2190 Marshall Ave., St. Paul, Minn. 55104, and Richard L. Scheuerman, Inver Grove, Minn.; said Scheuerman assignor to said Oja
Filed July 8, 1965, Ser. No. 470,429
6 Claims. (Cl. 188—5)

This invention relates to new braking means, and particularly to mobile devices equipped with the novel means of the invention for braking against movement.

The invention provides specialized braking means wherein the control for braking may be positioned for the convenience of the user. The control for braking is easily operated, and is manually operated. It requires so little strength and movement that many invalids and infirm individuals, who retain some control over their arm movements, are quite capable of effecting the braking operation quickly, or releasing the braking condition quickly, without the discomfort of undue movement or strain.

A particularly novel feature of the manual braking means of this invention is that with respect to the toggle mechanism. Ordinarily, one would expect that a toggle mechanism for the extension of telescoping members would be pivotally attached externally to each telescopically engaged part. In the case of the instant invention, however, the toggle mechanism is pivotally attached internally to each telescopically engaged part. Such attachment permits the toggle control for braking to be located at any desired point along the length of the outermost member of the telescopically engaged parts. This feature is important in connection with mobile hospital and rehabilitation equipment (such as mobile chairs, stretchers, tables and other articles) which infirm and invalid persons need, and which they like to brake from movement over a floor by themselves. The feature is particularly vital in the case of mobile invalid chairs.

Figure 1:
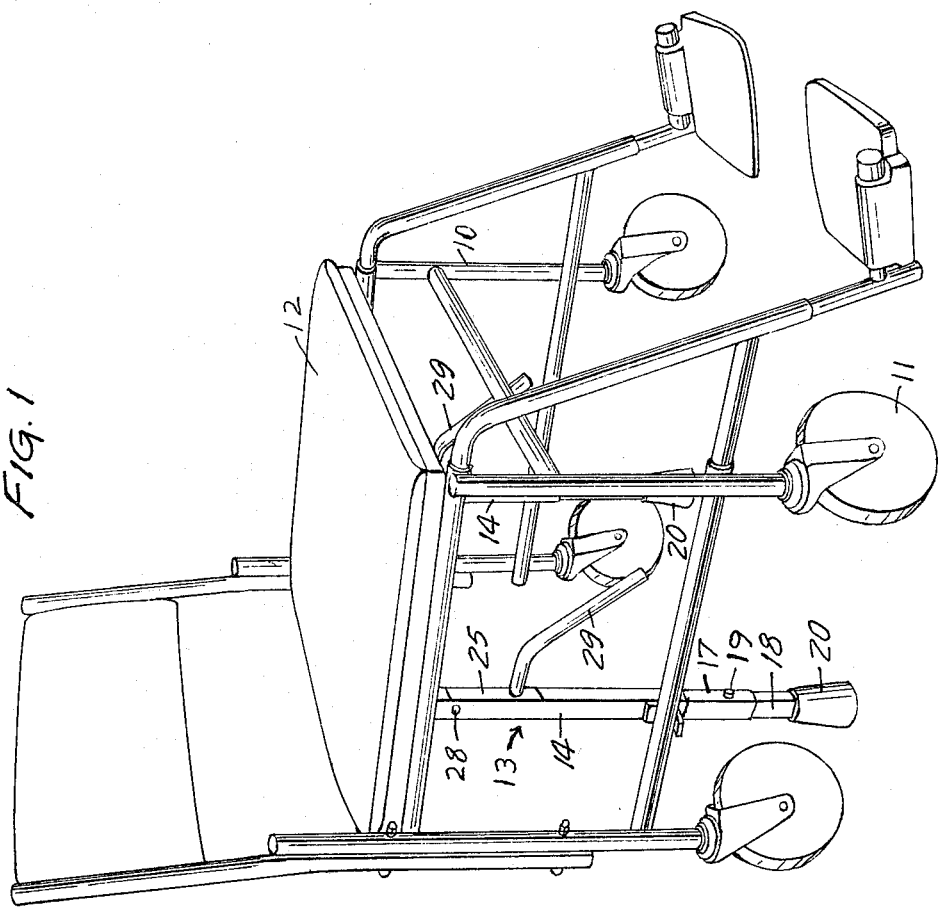
Figure 2:
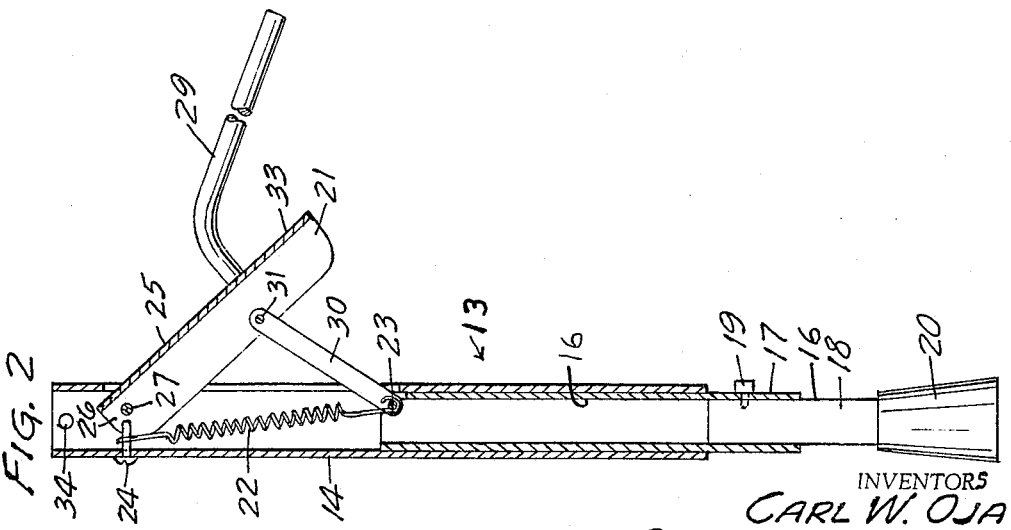

The invention will be described by reference to a drawing, wherein:

FIGURE 1 is a schematic perspective view of a mobile chair having two braking means according to the invention, one mounted on each side of the chair; and FIGURE 2 is a cross-sectional longitudinal view of braking apparatus according to the invention.

As illustrated in the drawing, the mobile device or chair has a frame 10 mounted on wheels 11. Customarily, at least three wheels are used. The wheels may be any suitable size, smaller wheels being sometimes called casters. A platform, suitably a chair seat 12, is supported on the frame in elevated condition in relationship to the wheels 11. Braking means 13, preferably two complete assemblies of braking apparatus, is located beneath the platform and attached or mounted on the frame by any suitable means such as screws, bolts, flanges, clips and the like.

The braking apparatus 13 includes a tubular element 14 which is hollow in character and constitutes the outermost member of telescopically engaged parts. It is mounted and oriented on the frame of the mobile device in an essentially vertical orientation to (or in an essentially perpendicular relationship to) a plane through the wheels of the mobile device. The lower terminus of tubular element 14 is spaced from the surface supporting the wheels of the device so as to accommodate below that terminus the projecting parts of internally telescoping plunger 16 and associated elements (including a braking foot 20). Suitably, the spacing is from 2 inches up to 8 or 10 inches (5 to 20 or 25 centimeters). This spacing varies depending upon the nature of the mobile device to which the braking means is attached and the movement required or desired for the plunger 16 and associated elements.

Plunger 16, which is telescopically engaged within the lower end of tubular element 14, is normally withdrawn from the surface supporting the wheels of the device so as to permit free rotation of the wheels and free mobility for the device. Plunger 16, however, is adapted to be extended downwardly from the tubular element to engage the surface supporting the wheels of the device and thereby brake the device against movement. Preferably, plunger 16 is adjustable in length so as to permit adjustment of braking contact of its end. To gain adjustability, plunger 16 comprises a holding member 17 which extends telescopically within tubular element 14, plus a leg 18 held by set screws 19 in fixed relationship to the holding member 17. The end of leg 18, which is adapted to engage a floor or other surface, may be provided with a friction element such as a rubber foot or cap 20. It should be understood that position of leg 18 in holding member 17 is such that leg 18 (in combination with any cap 20 on its end) contacts and also asserts pressure against a floor (or other surface) supporting the wheels of the device. This correct position for leg 18 to accomplish braking is first determined after mounting the braking apparatus on a mobile device; and then the set screw (or other means to fix the elements of plunger 16 in rigid relationship) is fastened to hold the leg 18 and holding member 17 in rigid relationship.

A toggle mechanism 21 (shown in outwardly pivoted position for clarity in FIGURE 2) is used to extend the plunger 16 downwardly from tubular element 14 and to retract it from its extended condition. In the outwardly pivoted position for the toggle mechanism, the plunger 16 is retracted from its extended condition so that the friction element 20 is not in contact with a floor or other supporting surface for wheels of a device.

Means 22, suitably a coil spring, extends from a pivot point 23 (a pin or shaft) in plunger 16 to a means such as a screw 24 located upwardly from plunger 16. The means 22 biases the plunger 16 in a retracted condition from a floor or other supporting surface. Means alternative to a spring (e.g., weights, including reliance upon the weight of pivotable toggle means and the weight distribution thereof during toggle operation) may be used to bias the plunger in a retracted position from a floor or other supporting surface.

Some very significant features of the braking means will now be emphasized. One of the arm means of the toggle mechanism includes a longitudinal segment 25 out of tubular member 14 and extending along one side of the tubular member 14. This longitudinal segment 25 is separate from the tubular member; and it may comprise a segment of one complete side of a square tubular member. One end of this longitudinal segment is equipped with a flange extension 26 extending inwardly from the segment so that the flanged extension is located within tubular member 14. An inward flanged extension 26 is suitably on each lateral side of one end of the segment 25, and perpendicular to the segment 25 out of a square tubular member. A pin 27 extends through the flanged extension (or extensions), and journals on a bearing surface in the walls of tubular member 14. The pin 27 for pivot of arm 25 may suitably be affixed in the walls of tubular member 14 by a nut 28 (see FIGURE 1) on each end of the pin. Segment 25 is equipped with a handle member 29 attached externally to the segment. Handle 29 may be gripped by a person to pivot the segment 25 outwardly from the tubular member into a non-braking position (as illustrated in FIGURE 2), and return segment 25 to a position flush with the tubular member for braking (as illustrated in FIGURE 1). The braking position illustrated in FIGURE 1 presents a neat uniform appearance with the segment 25 essentially flush with the surrounding surface of the tubular member 14.

The other of the arm means of the toggle mechanism includes at least one connecting rod 30 (preferably two connecting rods for added strength), extending from a toggle pivot pin 31 on the toggle arm segment 25 to lower arm pivot pin 23 journaled in bearing recesses of plunger 16 (that is in wall portion of hollow holding member 17 of plunger 16). Note that the pivot connection of arm 30 to plunger 16 is at a location on the plunger which remains within the tubular element 14 during both extremes of movement of the plunger as effected by the toggle mechanism.

Observe that the segment 25, which serves as one arm of the toggle mechanism, has an extension or tail end 33 beyond toggle pivot 31. This extra end 33 serves to cover the portion of the opening in tubular member 14 needed for effective toggle operation of arm 30 as it moves out of the confines of the tubular member 14 to withdraw plunger 16 from contact with a floor.

Means such as a hole or aperture 34 (see FIGURE 2) is useful to attach the braking means to a frame of a mobile device.

It should be recognized that the braking position (the closed position illustrated in FIGURE 1) for the toggle mechanism causes pivot shaft 31 to be located laterally inward from a plane or line passing through pins 23 and 27 of the toggle arms. In other words, toggle pin 31, in the closed braking position, occupies a position which is laterally inward from a plane through pivot shafts 23 and 27; and toggle pin or shaft 31 occupies a position laterally outward from a plane through pivot shafts 23 and 27 when the toggle mechanism is in open or non-braking condition (as illustrated in FIGURE 2). The inward lateral displacement of toggle pin 31 in the braking condition is opposite to that outward lateral displacement for toggle pivot 31 in the non-braking condition (shown in FIGURE 2). During braking, toggle pivot 31 moves through the plane extending through pins 23 and 27 and comes to rest at an inward location displaced laterally from the plane through pins 23 and 27. Thus, braking condition is maintained until positive action is taken to displace the toggle mechanism and move pivot pin 31 to the outward position shown in FIGURE 2.

Preferably tubular member 14 is a square tube (or an essentially square tube) instead of a round one; and the plunger 16, particularly its tubular or top member 17, is also preferably essentially square so as to mate snugly and telescopically with the outer member 14.

If desired, elements of the braking apparatus may be duplicated in whole or in part. For example, leg 18 may be equipped with lateral extensions holding laterally positioned legs; and the lateral legs may be equipped with friction caps 20. Also, if desired, the elements of the device may be reversed in position and used in braking.

In operation, as the handle 29 of the toggle mechanism is displaced downwardly from its FIGURE 2 position, segment 25 closes the opening of tubular element 14 and the toggle pivot 31 passes through a plane common to arm shafts or pins 23 and 27 to a position laterally inward and opposite to the laterally outward position the toggle pivot occupies in the open non-braking condition shown in FIGURE 2. The closing of segment 25 serves to extend or distend the arms of the toggle mechanism, and to extend plunger 16 downwardly so that the friction element 20 bears with some pressure against a floor and brakes movement.

That which is claimed is:

1. A mobile device having a frame mounted on wheels, a platform supported on the frame in elevated condition in relationship to the wheels, and braking means located beneath said platform and mounted on said frame, said braking means comprising at least one assembly of elements including a tubular element oriented essentially vertically in relation to a plane through the wheels of said mobile device, said tubular element being spaced from the surface supporting the wheels of said device, a plunger telescopically engaged within the lower end of said tubular element and normally withdrawn from the surface supporting the wheels of said device but adapted to be extended downwardly from said tubular element to engage with said surface, a toggle mechanism for extending said plunger downwardly from said tubular element and retracting said plunger from its extended condition, and biasing means within said tubular element for biasing said plunger in a retracted condition from the surface supporting the wheels of said device, said tubular element having an elongated essentially vertical opening along one side thereof, one of the arm means of the toggle mechanism including a longitudinal segment out of said tubular element along one side thereof at said opening and separated therefrom, with a flange extension inwardly from one end of said segment pivotally connected to said tubular element and a handle member attached externally to said segment to permit said segment to be pivoted outwardly from said tubular element into a non-braking position and returned thereto for braking, the other of the arm means of said toggle mechanism including at least one connecting rod pivotally attached to said plunger at a location on said plunger which remains within said tubular element during both extremes of movement of said plunger as effected by said toggle mechanism, the pivot between said arm means of said toggle mechanism being within said tubular element when said plunger is in said extended condition.

2. A mobile device as in claim 1 wherein the tubular element and the telescopingly engaged plunger of the braking means are essentially square in cross section.

3. A mobile device as in claim 1 wherein the longitudinal segment of said one of the arm means of the toggle mechanism is equipped with a flanged extension inwardly of each lateral side of the longitudinal segment, and each said inwardly flanged extension is pivotally connected to the tubular element therewithin.

4. A mobile device as in claim 1 having at least two braking means mounted on its frame.

5. A mobile device as in claim 1 wherein the plunger of the braking means is adjustable in length.

6. A mobile device as in claim 1 wherein the plunger of the braking means is equipped with a friction foot element adapted, for braking, to be placed in pressure engagement with the surface supporting the wheels of the mobile device.

References Cited by the Examiner
UNITED STATES PATENTS 2,132,467  10/1938  Hanson.
2,798,232   7/1957  Ericsson.

MILTON BUCHLER, *Primary Examiner.*

B. S. MOWRY, *Assistant Examiner.*